Figure 3:
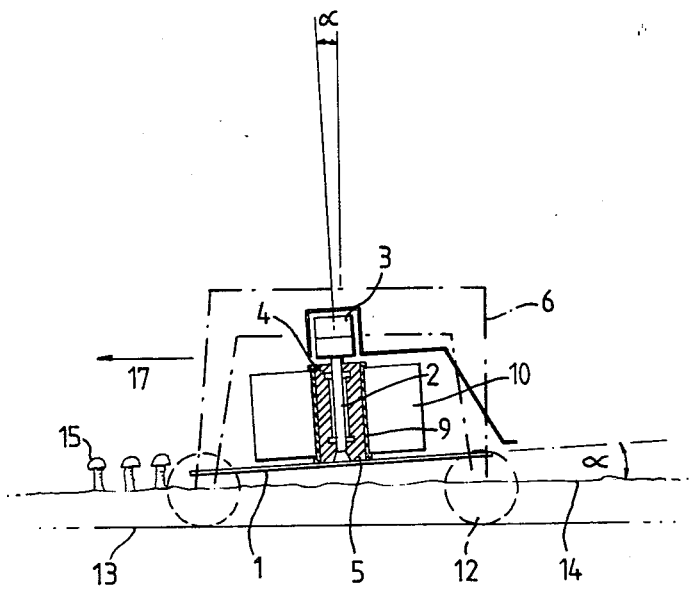

United States Patent [19]

Kateman

[11] 4,344,275
[45] Aug. 17, 1982

[54] MUSHROOM HARVESTING MACHINE

[76] Inventor: Wilhelmus G. M. Kateman, 5, Hoogriebroekseweg, 5088 AA Oirlo, Netherlands

[21] Appl. No.: 223,323

[22] Filed: Jan. 8, 1981

[30] Foreign Application Priority Data

Jan. 11, 1980 [BE] Belgium .................................. 881104

[51] Int. Cl.³ ............................................. A01D 45/00
[52] U.S. Cl. ................................... 56/327 R; 56/13.6; 56/192
[58] Field of Search .................. 56/192, 13.6, 13.7, 56/14.5, 235, 327 R, 327 A

[56] References Cited

U.S. PATENT DOCUMENTS 3,921,723 11/1975 Seem ................. 56/327 R
3,972,158 8/1976 Lindstrom ............................. 56/13.6
4,037,390 7/1977 Vogelenzung ....................... 56/14.5
4,275,547 6/1981 Oosterling et al. .................. 56/13.6

FOREIGN PATENT DOCUMENTS 565502 7/1957 Italy ....................................... 56/192
244782 5/1969 U.S.S.R. ............................... 56/235

Primary Examiner—Jay N. Eskovitz
Attorney, Agent, or Firm—Majestic, Gallagher, Parsons & Siebert

[57] ABSTRACT

Mushroom harvesting machine provided with rotary knives which are positioned in stepped formation sequentially one below the other and with an upright conveyor belt provided with carriers and wherein the rotary knives are positioned at an angle of inclination α.

5 Claims, 3 Drawing Figures

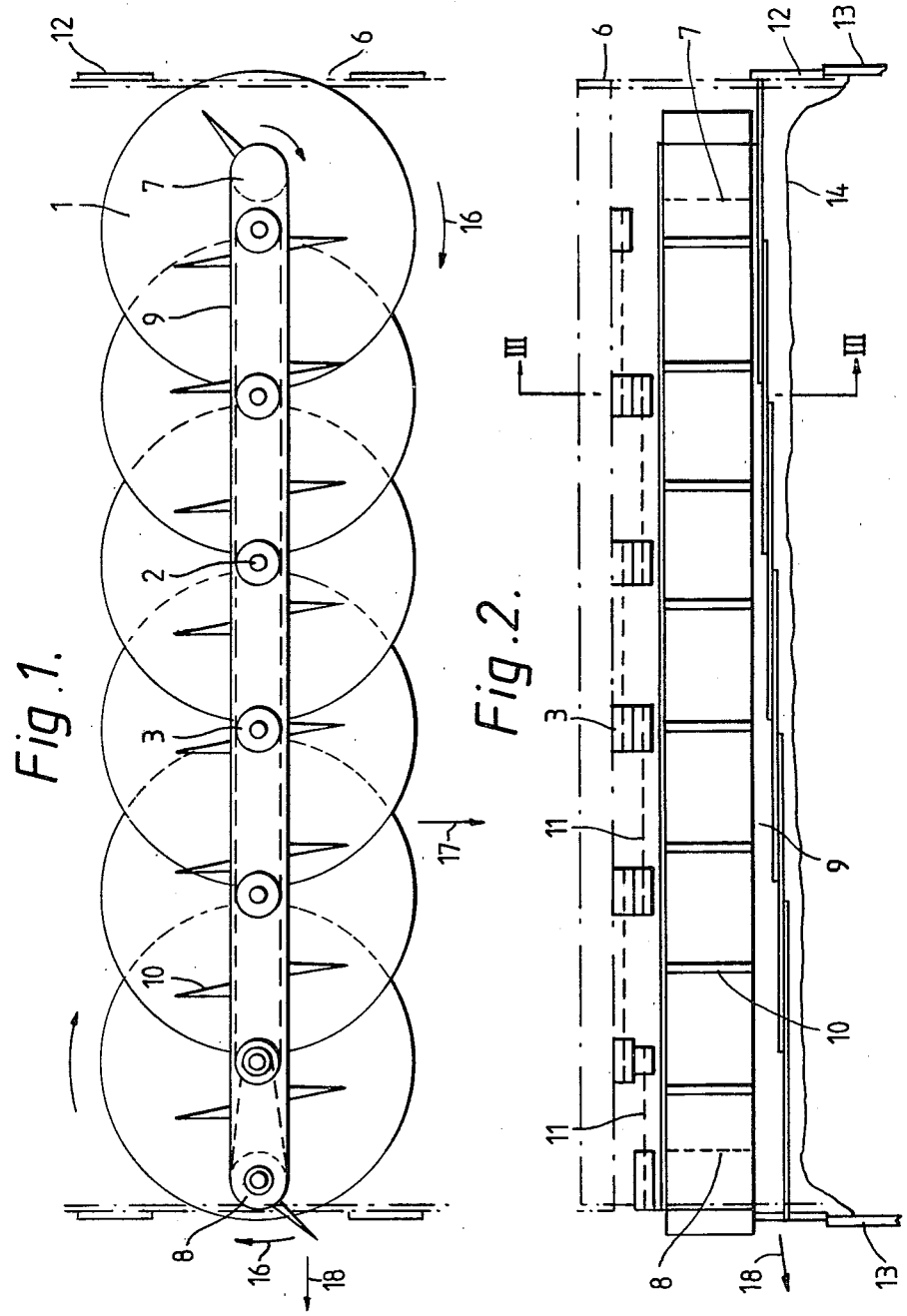

MUSHROOM HARVESTING MACHINE

The invention concerns a mushroom harvesting machine. Mushrooms ready for harvesting are often picked by casual workers. The picking performance, depending on various factors such as the space between the culture beds, the number of mushrooms thereon etcetera is highly variable. The picking should be done in such a way that damage, bruises and resulting browning of the mushrooms is avoided. Only experienced pickers are capable of meeting this requirement. The recruitment of experienced personnel at present is not only difficult, but also from economical reasons is it necessary to effect the picking by machinery.

It is the object of the invention to provide a harvesting machine allowing to effect the harvesting by less skilled personnel, and by which a higher production is achieved and a minimal spoilage percentage as a result of damage is ensured.

According to the invention the harvesting machine is provided to this effect with rotary knives positioned in stepped formation sequentially one below the other and with an upright conveyor belt provided with carriers.

The rotary knives are positioned at an angle of inclination $\alpha$.

One embodiment of the harvesting machine according to the invention will now be described, by way of example, with reference to the accompanying drawings.

FIG. 1 is the top view;
FIG. 2 the front view and
FIG. 3 a cross section on the line III—III of FIG. 2.

The harvesting machine is fitted with a plurality of rotary knives 1. Each knife is connected to a wheel 3 through a shaft 2.

The knives are mounted by means of bearings 4 in a machine block 5 suspended in a frame 6.

On the frame 6 are rotatably mounted the conveyor rollers 7 and 8 over which runs an upright conveyor belt 9 with carriers 10. The wheels 3 and the conveyor roller 8 are coupled together through chains, geared belts 11 or otherwise and are centrally driven by a drive unit, not shown. The central drive may contain a horizontal drive axle provided with coned gears nested with corresponding coned gears, one on each rotary knife shaft. On the frame 6 are furthermore mounted the guide wheels 12 whereon the harvesting machine is advanced along and over walls 13 disposed for that purpose, wherebetween the culture bed 14 is provided with mushrooms 15 to be harvested thereon.

In the embodiment, the rotary knives 1 are arranged at an angle of inclination $\alpha$ which is determinative of the position of said knives relative to the walls 13 and the culture bed 14, as shown in FIG. 3.

The manner of adjustment of the angle of inclination $\alpha$ need not be restricted to the embodiment but may also be effected in other manners.

When the harvesting machine is put in operation, the rotary knives 1 as well as the conveyor belt 9 with carriers 10 start moving in the direction of the curved arrows 16 in FIG. 1. When the machine is thereafter advanced over the walls 13 in the direction of the straight arrows 17, the stems of the mushrooms 15 are cut off above the surface of the culture bed 14. The cut parts arrive then on the top side of the rotary knives 1, which through their cutting motion, likewise being a rotary motion, conduct same in the direction of the upright conveyor belt 9, where they are further transported by the carriers 10 until they are discharged at the side of the harvesting machine at the arrows 18 for further grading and processing.

The magnitude of the angle of inclination $\alpha$ ranges between 0° and 10°. It has been found experimentally that at an angle of inclination of $\alpha$ magnitude of 3°, the harvesting machine operates optimally. It is possible to use the harvesting machine in combination with an added shoot stubbing machine or other processing units.

I claim:

1. Mushroom harvesting machine, characterized in that it is provided with rotary knives which are positioned in stepped formation sequentially one below the other and with an upright conveyor belt provided with carriers, and wherein said upright conveyor belt is provided above said rotary knives and disposed substantially in line therewith, and said carriers are disposed spaced above and substantially upright from the rotary knives so that said carriers and the stepped rotary knives can transport the mushrooms.

2. Harvesting machine according to claim 1, characterized in that the rotary knives are positioned at an angle of inclination $\alpha$.

3. Harvesting machine according to claim 2, characterized in that the magnitude of the angle of inclination $\alpha$ ranges between 0° and 10°.

4. Harvesting machine according to claim 2, characterized in that the magnitude of the angle of inclination $\alpha$ ranges between 3° and 10°.

5. Harvesting machine according to claim 1, having wheels and wherein each rotary knife is operably connected to a wheel and characterized in that the wheels and the upright conveyor belt are coupled together and are driven centrally.

* * * * *